United States Patent [19]
Marston et al.

[11] Patent Number: 5,504,161
[45] Date of Patent: Apr. 2, 1996

[54] VINYLPYRIDINE POLYMER SUPPORT COMPLEXED WITH BORON TRIFLUORIDE

[75] Inventors: Charles R. Marston, Indianapolis; Gerald L. Goe, Greenwood, both of Ind.

[73] Assignee: Reilly Industries, Inc., Indianapolis, Ind.

[21] Appl. No.: 702,355

[22] Filed: May 15, 1991

Related U.S. Application Data

[63] Continuation of Ser. No. 331,848, Apr. 3, 1989, abandoned.
[51] Int. Cl.$^6$ .............................. C08F 12/36; C08F 26/06
[52] U.S. Cl. ...................................... 525/327.1; 525/117
[58] Field of Search .................................. 525/117, 327.1

[56] References Cited

U.S. PATENT DOCUMENTS

| | | |
|---|---|---|
| 2,717,885 | 9/1955 | Greenlee . |
| 2,839,495 | 6/1958 | Carey . |
| 2,909,494 | 10/1959 | Parry et al. . |
| 3,004,952 | 10/1961 | Brueschweiler et al. . |
| 4,436,880 | 3/1984 | Irving ........................................ 525/504 |
| 4,683,282 | 7/1987 | Goel ........................................ 528/91 |

FOREIGN PATENT DOCUMENTS

| | | | |
|---|---|---|---|
| 0209733 | 1/1968 | U.S.S.R. ................................. | 525/117 |
| 955748 | 4/1964 | United Kingdom . | |
| 955873 | 4/1964 | United Kingdom . | |
| 956044 | 4/1964 | United Kingdom . | |
| 963058 | 7/1964 | United Kingdom . | |

OTHER PUBLICATIONS

Sket & Zupan, "Polymer– Supported Boron Trifluoride", *Journal of Macromol. Sci.–Chem.*, vol. A19, No. 5, 1983, pp. 643–652.

Reillex Tar & Chemical Corp., *Reillex*™ Report 2, Indianapolis, Indiana, 1986.

J. O. E. Otaigbe, et al., "Polymeric Reagents: Part 1. Synthesis of Polymer–anchored Amines Useful for Curing Epoxy Resins," *British Polymer Journal* 20 (1988), pp. 53–59.

*Reillex*™*: A New Family of Cross–linked Polyvinylpyridines from Reilly* (Reillex™ Report 2, 1986), a publication available from Reilly Industries, Inc., Indianapolis, Indiana.

J. J. Harris and S. C. Timin, "Proposed Mechanism for the Curing of Epoxy Resins with Amine–Lewis Acid Complexes or Salts," *Journal of Applied Polymer Science*, vol. 10, pp. 523–534 (1966).

*Pyridine Catalysis*, (1983) a publication available from Reilly Industries, Inc. Indianapolis, Indiana.

*Linear Polyvinylpyridines Properties and Applications*, (1983), a publication available from Reilly Industries, Inc., Indianapolis, Indiana.

*Primary Examiner*—Robert E. Sellers
*Attorney, Agent, or Firm*—Woodard, Emhart, Naughton, Moriarty & McNett

[57] ABSTRACT

A latent curing agent for an epoxy resin comprising boron trifluoride on a cross-linked polymer support having at least 10% by weight of pendant pyridine groups. The polymer support is preferably about 25% to 40% cross-linked, and preferably in the form of porous, macroreticular beads having average diameters of less than 30 μm. The combination of this latent curing agent admixed with an epoxy resin is also disclosed, as is the process for making and using the same.

14 Claims, No Drawings

VINYLPYRIDINE POLYMER SUPPORT COMPLEXED WITH BORON TRIFLUORIDE

This application is a continuation of application Ser. No. 07/331,848, filed Apr. 3, 1989 now abandoned.

BACKGROUND OF THE INVENTION

This invention relates generally to the field of epoxy resin chemistry, and, more particularly, to novel epoxy resin curing agents comprising a Lewis acid such as boron trifluoride on a cross-linked polymer support having pendant pyridine groups, and to combinations and to curing processes incorporating the same.

Broadly defined, the term "epoxy" refers to a chemical group consisting of an oxygen atom bonded with two carbon atoms already united in some other way. A simple example of an epoxy group is the compound ethylene oxide (A), known also by the name "oxirane."

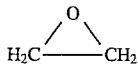
A

The term "epoxy resin," as generally used in the art, refers to any molecule containing two or more epoxy groups. This technology had its genesis in research conducted in the United States and Europe just prior to World War II, and the interest in and production of epoxy resin has continued to grow since that time. Epoxy resins have proven to be enormously versatile compounds, and accordingly are used in thousands of industrial applications including adhesives, body solders, caulking compounds, casting compounds, sealants, potting and encapsulation compounds, and laminating resins. Epoxy-based solution and powder coatings are used as maintenance and product finishes, marine finishes, masonry finishes, structural steel coatings, tank coatings, aircraft finishes, automotive primers, can and drum linings, and collapsible-tube coatings, etc. For a further and more in-depth discussion of epoxy resin technology from its beginnings, reference can be made to H. Lee and K. Neville, *Handbook of Epoxy Resins*, New York, McGraw Hill (1967). Many other publications are also available including numerous patents which can provide additional background relating to work in the area. See, e.g., U.S. Pat. Nos. 3,004,952, 2,909,494, 2,717,885, and 2,839,495, and English Patent Nos. 955,748, 955,873, 956,044, and 963,058.

The most valuable single property of epoxy resins is their ability to transform readily from the liquid (or thermoplastic) state to tough, hard thermoset solids upon mixing with a suitable curing agent (also referred to as a hardener, activator, or catalyst). It is often necessary to heat the resulting mixture in order to effect this transformation depending upon the precise epoxy resin and curing agent used.

Common examples of such curing agents useful for reacting with epoxy resins include (1) amines; (2) anhydrides; (3) catalysts such as peroxides or amides; (4) Lewis acid-amine complexes (See C. A. May and Y. Tanaka, *Epoxy Resins Chemistry and Technology*, Marcel Dekker Inc., N.Y. 1973, p. 293); and (5) various methods combining two or more of the (1)–(4) means.

Focusing on category (4), many Lewis acid-amine complexes have shown to be effective as latent epoxy resin hardeners for use in prepreg laminates, casting compounds, or the like involving heat-cure type applications. Such complexes are generally intended to remain stable for extended periods alone or admixed with the desired epoxy resins. Upon heating, the combinations thereafter transform into thermoset solids with superior physical properties.

Of the many suitable Lewis acids known or reported in the literature (see, e.g., H. Lee and K. Neville, *Handbook of Epoxy Resins*, New York, McGraw Hill (1967) p. 11–12), boron trifluoride ($BF_3$) has been the most commonly used to prepare amine complexes for epoxy curing applications. Although this discussion will concentrate on the Lewis acid, boron trifluoride, and its resultant amine complexes, no limitation is thereby intended.

Suitable amines for the formation of epoxy resin curing Lewis acid complexes have included primary or secondary monoamines which are typically reported as solids having long-room-temperature pot lives (in excess of six months) after dissolution or suspension in the epoxy resin material. For example, monoethylamine boron trifluoride has been reported commercially, as an epoxy curing agent as have benzylamine-$BF_3$, piperidine-$BF_3$, and a number of analine-$BF_3$ derivatives. Tertiary monoamine derivatives, on the other hand, have been rarely encountered in the art and have been disfavored in part due to their inherently high activation temperatures. For example, the heat-cure activation temperatures for the primary and secondary derivatives already mentioned are around 130° C. and 170° C., respectively, while it is as high as 225° C. for a tertiary monoamine such as pyridine.

The number of amine moieties in these complexes has also been a point of interest. For example, those mentioned above are monoamine compounds which have been clearly preferred in the literature. Diamine and triamine Lewis acid (BF3) complexes have also been reported, but much less often and with less favorable comments. For example, U.S. Pat. No. 4,683,282 to Goel reports useful boron trifluoride complexes of poly(ethylene oxide) di- and tri-primary and secondary amines which are generally liquids and have relatively low activation temperatures (<140° C.) and generally give flexible thermoset polymers.

U.S. Pat. No. 3,004,952 to Brueschweiler et al. discloses hardenable compositions which comprise an epoxy compound, tetrahydrofuran, boron trifluoride, and a small proportion of water and/or a nitrogenous base as a moderator capable of complexing with the boron trifluoride. Among the moderators mentioned and claimed in the Brueschweiler patent are ethylene diamine and hexamethylene tetramine which have two and four amine moieties per molecule, respectively, although no examples illustrating the use of these two compounds are given.

An article by J. Otaigbe, R. Banks, and S. Smith, "Polymeric Reagents: Part 1. Synthesis of Polymer-anchored Amines Useful for Curing Epoxy Resins", British Polymer Journal 20 (1988) 53–59, describes the use of "polymer-anchored amines" (PAA's) to harden epoxy resins. The PAA's described include a range of polymers carrying amino-functions which were synthesized via amination of styrene-vinylbenzyl chloride copolymers, poly(epichlorohydrin), and poly(2-chloroethyl vinyl ether), and via homopolymerization and copolymerization with styrene of (n-butyl)(vinylbenzyl)-ammonium chloride.

The authors reported satisfactory results using linear styrene-based PAA's, with the best of the PAA curing agents tested being derived from low molecular weight styrene-co-vinylbenzyl chlorides. In experiments in which epoxy resin was hardened using an intentionally 2% cross-linked styrene-based polymer, or another styrene-based polymer which unintentionally contained some cross-linked material, the authors reported that unsatisfactory results were obtained, with the epoxies produced being inhomogeneous, friable and incapable of adhering to aluminum foil dishes in which the epoxy composition was hardened. The article does not suggest complexing any of the polymers tested therein with a Lewis acid to form a curing agent.

Therefore, to the applicants' knowledge, no Lewis-acid polyamine complexes having more than three amine moieties per molecule have been reported in the art as being suitable latent curing agents for epoxy resin applications.

Moreover, despite the good performance characteristics typical of the above-mentioned Lewis-acid amine complexes, they all suffer one or more common defects. For example, they may be difficult to handle in typical processing applications, and leave trace amines and/or Lewis acids in the finished polymers which are smelly, toxic or volatile, may be corrosive to glass and/or metal, or may be very hygroscopic which can lead to serious errors in weights, or may suffer deactivation in the presence of moisture.

In light of these disadvantages, there has long existed a need for improved curing agents in this area. The applicants' discovery meets this need.

SUMMARY OF THE INVENTION

The applicants have made the significant and unexpected discovery that certain polymeric amines complex with Lewis acids such as boron trifluoride to make excellent latent epoxy curing agents which do not exhibit the disadvantages of heretofore known compounds. These preferred polymeric amines (or polyamines as they are also called) comprise a cross-linked polymer support having at least about 10% by weight pendant pyridine groups.

Accordingly, one preferred aspect of the applicants' invention involves a novel latent epoxy resin curing agent comprising boron trifluoride complexed with this cross-linked polymer support. Another aspect involves a novel latent heat-curable epoxy resin-curing agent combination comprising boron trifluoride complexed with this cross-linked polymer support and admixed with an epoxy resin. Still another aspect involves preferred processes incorporating these same curing agents and epoxy resins. Taken together, these embodiments have demonstrated advantages of long room temperature pot lives both before and after mixing due at least in part to their resistance to inactivation or other damage by moisture. They have also proven to be thermally stable and have demonstrated sufficiently long pot lives after mixing and heating to moderate temperatures (or liquifying in the case of solid resins), which are below those temperatures needed for curing. Additionally, upon curing they have not liberated corrosive and toxic hydrogen fluoride gas, and have formed uniform, consistent and substantially transparent hardened castings which have not exhibited obnoxious or volatile amine residues.

Further and related objects and advantages will be apparent from the description that follows.

DESCRIPTION OF THE PREFERRED EMBODIMENT

For the purposes of promoting an understanding of the principles of the invention, reference will now be made to several aspects of the applicants' work and specific language will be used to describe the same. It will nevertheless be understood that no limitation of the scope of the invention is thereby intended, such alterations and further modifications, and such further applications of the principles of the invention therein being contemplated as would normally occur to one skilled in the art to which the invention relates.

In accordance with the above discussion, one preferred aspect of the applicants' invention involves novel latent curing agents for epoxy resins which demonstrate excellent curing properties while eliminating many of the disadvantages of heretofore known compounds. Stated broadly, these preferred curing agents comprise a Lewis acid such as boron trifluoride (BF3) on a cross-linked polymer support containing at least about 10% by weight of pendant pyridine groups.

To date, the applicants' most preferred polymers have been cross-linked poly(2- and 4-vinylpyridine) copolymers. Several of these poly(4-vinylpyridine) copolymers are commercially available under the REILLEX™ family of trademarks from Reilly Industries, Inc. of Indianapolis, Ind. In these REILLEX™ copolymers, substantial pyridine ligands are attached directly at their pyridine 4- positions to the copolymers' poly ethenyl backbones which are in turn cross-linked with some percentage of divinylbenzene being present. REILLEX™ 425, for example, has shown to be most preferred, being a 25% cross-linked copolymer of 4-vinylpyridine and a commercially available divinylbenzene. REILLEX™ 425 exhibits a convenient, highly porous macroreticular bead form having good thermal stability. In its most preferred form, the REILLEX™ 425 polymer has had average bead diameters up to about 10 µm. This small bead size has aided in improving the distribution, suspension and reactivity of the curing agent within the epoxy resin matrix and has fostered the formation of uniform and consistently hardened resins which have been substantially transparent in appearance.

Other preferred polymers have to date included, for example, a second cross-linked poly(4-vinylpyridine) copolymer commercially available under the REILLEX™ 402 trademark and a cross-linked poly(2-vinylpyridine) copolymer. Of these, the poly(2-vinylpyridine) copolymer is a 25% cross-linked copolymer of 2-vinylpyridine and a commercially available divinylbenzene prepared according to the process described in connection with Examples 2–5 and Table I below. In other relevant respects, the poly(2-vinylpyridine) copolymer is similar in its performance to the REILLEX™ 425 described above. The REILLEX™ 402 polymer is a 2% cross-linked copolymer of 4-vinylpyridine and a commercially available divinylbenzene. The REILLEX™ 402 material is a granular powder, in contrast to the bead forms of REILLEX™ 425, but has still shown to be acceptable for use in the applicants' invention herein.

For more detail as to the chemical make-up and characteristics of these or other REILLEX™ polymers, reference can be made to relevant literature available either through the industry or from the manufacturer itself. One such reference is a brochure published by Reilly Industries, Inc. entitled *REILLEX™: A New Family of Cross-linked Polyvinylpyridines* from Reilly (REILLEX™ Report 2, 1986), which is hereby incorporated by reference in all respects relevant and material to the patent application at hand.

In addition to these several REILLEX™ polymers, other cross-linked polymers which contain pendant pyridine groups to support the boron trifluoride or other Lewis acid are also suitable for use in the applicants' invention. In this regard, only certain limitations as discussed herein are understood to apply to such suitable polymers. One is that the polymers contain an effective amount of pendant pyridine groups to support and complex with the Lewis acid at loading levels sufficient to provide the beneficial curing activity achieved to a great extent by the applicants' preferred polymers discussed above. Also, experimentation has shown that at least some cross-linking of the polymer is desirable to achieve the dispersion, stability and later curing or hardening benefits found with the applicants' preferred polymers discussed herein.

As to what constitutes a sufficient amount of pendant pyridine groups, this will, of course, vary depending on many factors including the type of epoxy resin used, the amount of curing agent used, and the duration and temperature of the curing process. The applicants' most preferred polymers have had pyridine levels in excess of about 50% by weight as exhibited in the applicants' REILLEX™ and other polymers set forth in the Examples below.

As to what constitutes sufficient cross-linking, the applicants' experiments have suggested that polymers cross-linked at levels from 2–50% provide acceptable curing activity, with more preferred levels being between about 25–40% cross-linking. Also, although gel resins are usable, it is most preferred that the polymer support be in the form of a porous, macroreticular bead. In this regard, although bead size and other physical characteristics of acceptable polymer supports have not been shown to be critical, average bead sizes up to about 30 μm have been more preferred and sizes up to about 10 μm have been most preferred based on work to date. Although various techniques used for polymerization or the like may influence these sizes, the interest is to achieve uniform dispersion or mixture of the curing agent in the epoxy resin material as this has shown to influence the consistency of the hardened casting after heat has been applied.

Once the desired polymer support is selected, the applicants' preferred epoxy resin curing agent has been prepared by reacting this polymer with boron trifluoride to form the needed complex. For example, most preferred to date has been slurrying REILLEX™ 425 in dry tetrahydrofuran (THF), and then adding an amount of boron trifluoride-diethyl ether complex dropwise to this slurry at room temperature. The resulting mixture is then stirred for approximately 2 hours, and filtered under $N_2$ and washed with a number of volumes of THF. Residual THF has then been removed by rotary evaporation at elevated temperatures and reduced pressures, typically about 50° C. and about 15 mm Hg, respectively.

The resulting REILLEX™ 425-boron trifluoride ($BF_3$) complex has proven to be an excellent latent curing agent for epoxy resins. This and others of the applicants' complexes tested have demonstrated valuable resistance to damage or inactivity from moisture and extended room temperature pot lives whether alone or admixed with an epoxy resin. They have also shown effective pot lives when admixed and heated with an epoxy resin to a gelling temperature to enable working with the resin in the liquid state, and have produced consistent, uniform and substantially transparent castings upon final curing. Moreover, the applicants' preferred REILLEX™ 425-boron trifluoride complex has proven to be thermally stable, active even in the presence of water, and substantially non-hygroscopic. These results are more detailed in the further description in the specific Examples below.

Another preferred aspect of the invention involves the combination of an epoxy resin with the applicants' preferred polymeric amine-Lewis acid latent curing agent as described above. As before, boron trifluoride has been the Lewis acid of choice although many others exist and are suitable equivalents thereof within the scope of the applicants' invention. As to polymeric amine supports, more preferred have been cross-linked poly(2- and 4-vinylpyridine) copolymers such as those described above, and particularly those commercially available under the REILLEX™ family of trademarks from Reilly Industries, Inc., with REILLEX™ 425 being the most preferred to date.

After the complex has been prepared, such as previously described, it has been admixed with an epoxy resin preferably in ratios from about 4:1 to about 9:1 parts by weight epoxy resin to complex. The precise ratio used, as well as the presence of other possible additives, depends on many factors and is within the skill of those working in this area. The preferred resin in the applicants' work has been liquid diglycidyl ether of Bisphenol-A, although many others are known and available in the art and are also within the scope of this invention.

As stated previously, the applicants' resulting heat-curable epoxy resin-curing agent combinations have been shown to have excellent properties relating to room temperature and gelling pot life, relating to clarity, consistency and uniformity of casting quality, and also relating to their resistance to damage or inactivation by moisture or other conditions commonly encountered. For example, in one experiment 12.5 parts by weight of REILLEX™ 425-boron trifluoride complex prepared as in Example 1 below was admixed with 87.5 parts of liquid diglycidyl ether of Bisphenol-A. The resulting suspension was allowed to stand covered for three days with no indication of gelling being observed thereby confirming its excellent room temperature pot life. A portion of the sample was then placed in an oven at 130° C., and gelled in less than 15 minutes to give a uniform, hard, and substantially transparent casting.

In another experiment, the preferred REILLEX™ 425-boron trifluoride complex was blended with a solid epoxy resin by the name of Araldite® ECN-1273(mp. 73° C.) marketed by Ciba-Geigy Corporation, Hawthorne, N.Y. 10532 (again 12.5 to 87.5 parts by weight) and heated to 90° C. The mixture was cooled to room temperature and the resulting solid was ground to a fine powder. The powder was applied to a steel bar at 200° C., and the powder melted and cured within 10 minutes forming a hard, smooth and substantially transparent coating.

Still another preferred aspect of the applicants' invention involves novel processes for curing epoxy resins. These processes are highlighted by combining amounts of the applicant's preferred complexes with an epoxy resin, and then heating the resulting mixture. The preferred materials and other parameters are as discussed above. As to reaction conditions, the applicants' preferred curing temperature has been about 130° C. which resulted in a hardening time of up to about 15 minutes. It is understood that other temperatures and durations, as well as other additives and modifiers, can be used to obtain desirable cures. These are within the ordinary skill in the art and are accordingly within the scope of the applicants' invention herein.

For the purposes of further promoting a better understanding of the curing agents, mixtures and processes of the present invention, reference will now be made in the Examples below to specific instances of their preparation and use. These Examples are exemplary only, and no limitation of the scope or breadth of the applicants' invention is thereby intended.

EXAMPLE 1

To 5 grams of dry REILLEX™ 425 polymer, which had been finely ground to pass through a 400-mesh screen (equal to about 30 μm bead size) and had been slurried in 50 cc of dry tetrahydrofuran at room temperature, was added dropwise, under continuous stirring, 3.5 grams of boron trifluoride-diethyl ether complex. A mildly exothermic reaction occurred raising the reaction temperature 3° from 20° C. to 23° C. The slurry was stirred, maintaining room temperature for 2 hours. The slurry was then filtered under $N_2$ and washed with 5 volumes of fresh THF. The residual THF was removed by rotary evaporation at 50° C. under a reduced pressure of 15 mmHg.

A solution of 87.5 parts by weight of liquid diglycidyl ether of Bisphenol-A (epoxy equivalent weight of about 330) and 12.5 parts of the above polyamine-$BF_3$ curing agent was prepared. The sample was allowed to stand covered for 72 hours and no gelation was observed, thereby confirming its beneficial room temperature pot life. The sample was then placed in a 130° C. oven where it gelled in less than 15 minutes to give a hard, transparent and uniform casting.

EXAMPLES 2–5

Examples 2–5 were carried out in the identical manner of Example 1 with changes as noted below and in Table I. In Example 2, 18.6 parts by weight of curing agent was used with 81.4 parts by weight epoxy resin. In Examples 3 and 4, 20 parts by weight of curing agent was used with 80 parts by weight epoxy resin. The resin used in each Example was liquid diglycidyl ether of Bisphenol-A marketed commercially by the Dow Chemical Company under the trademark D.E.R. 330™, having an epoxy equivalent weight of approximately 330. The mesh size in each Example was up to 30 μm (mesh), and the average polyamine bead size was 9–14 μm except in Example 5 in which an average particle size of approximately 30 μm was used. At least partially as a result of the larger particle size in Example 5, difficulties were encountered in maintaining dispersion of the polyamine-boron trifluoride complex in the liquid resin during curing. As a result, gelling in Example 5 was initially more localized near the lower part of the sample casting.

The specific polyamines used to complex with the Lewis acid to make the curing agents used in these Examples were obtained or prepared as follows: In Examples 1 and 5, the REILLEX™ 425 and 402 copolymers were commercially available from Reilly Industries, Inc. as discussed previously in the application. In Example 3, the 25% cross-linked poly(2-vinylpyridine) copolymer was prepared by initially providing a monomer solution containing 72 g of 2-vinylpyridine, 31 g of commercial divinylbenzene (80% DVB from Dow), 50 g toluene and 0.5 g of benzoyl peroxide. This monomer solution was added to 300 ml of an aqueous solution containing 1% by weight hydroxycellulose, 10% by weight sodium chloride and 0.04% by weight sodium hydroxide. This two-phase system was then stirred at a moderate rate under a nitrogen atmosphere at 60°–70° C. for 8 hours. The reaction mixture was cooled and the insoluble opaque polymer was isolated by filtration and washed with an excess of water. The polymer was then dried at 110° C. at atmospheric pressure overnight before use with the specified epoxy resin as described above. Similar procedures were used in Examples 2 and 4. In Example 2, the difference was that the monomer mixture contained 58.1 g of 4-vinylpyridine, 48.4 g of commercial divinylbenzene (80% DVB from Dow), 50 g of toluene and 0.5 g of benzoyl peroxide. In Example 4, on the other hand, the difference was that 72 g of 6-methyl-2-vinylpyridine was substituted for the equivalent amount of 2-vinylpyridine in Example 3. Otherwise, the reaction conditions and method of product workup in these several Examples were the same as previously described in Example 1.

In further interpreting Table I, it is common and known in the art that a curing or gelling time of around 15 minutes is desirable to provide for some working of the mixture. Also desirable is a moderate curing temperature not so high as to complicate handling of any given resin. Therefore, for the Examples that effectively gelled to produce a hard, transparent and uniform casting after 15 minutes at the temperature of 130° C., no effort was made to include gelling times at higher temperatures. In the case of Examples 4 and 5, additional curing time was needed as indicated in the Table.

TABLE I

| Example | Curing Agent Polyamine | Lewis Acid | Epoxy Resin | Pot Time (°C./hr) | Gel Times (min.) 130° C. |
|---|---|---|---|---|---|
| 1 | REILLEX™ 425 | $BF_3$ | D.E.R. 330™ | 22/72 | 15 |
| 2 | poly-4-vinylpyridine cross-linked with 40% divinylbenzene (DVB) | $BF_3$ | D.E.R. 330™ | 22/72 | 15 |
| 3 | poly-2-vinylpyridine cross-linked with 25% DVB | $BF_3$ | D.E.R. 330™ | 22/72 | 15 |
| 4 | poly-(6-methyl-2-vinylpyridine) cross-linked with 25% DVB | $BF_3$ | D.E.R. 330™ | 22/72 | a |
| 5 | REILLEX™ 402 | $BF_3$ | D.E.R. 330™ | 22/72 | b | a - An initial rubbery casting was observed after 15 min. at 130° C. Post-cure at 160° C. resulted in a smooth, hard, transparent casting.
b - Polymerization was observed only at 200° C. after 30 min. curing.

EXAMPLE 6

A solution consisting of 87.5 parts of D.E.R. 330™ epoxy resin (as used in the previous Examples) and 12.5 parts of the preferred REILLEX™ 425-$BF_3$ complex was prepared in a small aluminum cup and placed in a 80° C. oven. After 8 hours, the solution was still liquid and flowed easily. The cup was transferred to a 130° C. oven where gelling occurred in 15 minutes to give a hard, substantially transparent casting. In this way, it was demonstrated that the applicants' preferred curing agents have relatively long pot lives after mixing and heating to moderate temperatures which are below those needed for curing which make them desirable for a variety of possible uses including prepreg laminants, and other one-part epoxy resin formulations.

EXAMPLE 7

An amount of the preferred REILLEX™ 425-$BF_3$complex was placed in a 145° C. oven for 16 hours. A solution consisting of 87.5 parts of D.E.R. 330™ epoxy resin and 12.5 parts of this prebaked REILLEX™ 425-$BF_3$was prepared. Gelling occurred in 15 minutes at 130° C. to give a hard, substantially clear casting, demonstrating that the REILLEX™ 425-$BF_3$ complex is thermally stable even at elevated prebaking temperatures and thereafter may still be used effectively as a curing agent in many applications.

EXAMPLE 8

An amount of the preferred finely-ground REILLEX™ 425-$BF_3$ complex prepared as in Example 1 was placed in an enclosed environment at 100% relative humidity and 80° C. for an extended period. At intervals of 1 hour, 12 hours, and 1 day, 0.2 gram samples of this curing agent complex were removed from this environment and blended with quantities of D.E.R. 330™ epoxy resin. The ratio of components was 87.5 parts by weight resin to 12.5 parts by weight curing agent. Each of these samples was in turn placed in an oven at a temperature of 130° C. and found to completely gel into a hard, transparent and uniform casting in 15 minutes or less. This result verified that the applicants' preferred curing agent complex exhibited no loss of activity or other damage from prolonged exposure to moisture under the conditions of this Example.

EXAMPLE 9

This example was carried out in the manner of Example 8 except that the specified amounts of curing agent and epoxy resin were initially blended, with the resulting mixture then being placed in an enclosed environment at 100% relative humidity and 80° C. for the same periods of time. Samples were again tested at the stated intervals and were shown to completely gel into a hard, transparent and uniform casting in 15 minutes or less at 130° C. thereby proving that even in the admixed state, no loss of curing activity or other damage was experienced from prolonged exposure to moisture.

EXAMPLE 10

An amount of the preferred REILLEX™ 425-$BF_3$ complex (0.5 g) was mixed with water until a thick paste was obtained. This paste was then mixed with D.E.R. 330™ epoxy (3.5g) and placed in a 130° C. oven. After 2 hours, gelling had occurred to give a hard, substantially clear casting. In another experiment, a solution of epoxy (3.5g) and water (0.2g) was prepared before the addition of REILLEX™ 425-$BF_3$ complex (0.5 g). This mixture was in turn placed in a 130° C. oven for 2 hours during which time gelling also occurred to give a hard, substantially clear casting. These experiments demonstrated that while the presence of water may moderate the curing time, it does not prevent the effective curing agent activity of the REILLEX™ 425-$BF_3$ complex.

EXAMPLE 11

An amount of the preferred REILLEX™ 425-$BF_3$ complex (1.0g) was placed in a 100% relative humidity environment at room temperature for 24 hours. A weight gain of only 0.1g (10%) occurred during this period. Similar exposure of other samples yielded comparable results, thereby demonstrating that the preferred REILLEX™ 425-$BF_3$ complexes are substantially less hygroscopic than corresponding monomeric $BF_3$ amines which are known to experience up to 100% weight gain by water uptake under similar conditions.

EXAMPLE 12

To 3.5g of Araldite® ECN-1273 (MP=73° C.) was added 0.5 g of the preferred REILLEX™ 425-$BF_3$ complex at 90° C. The mixture was cooled to room temperature and the resulting glassy solid was ground to a fine powder. The powder was applied to a steel bar at 200° C. and the resin powder formulation melted and cured within 10 minutes to form a hard, smooth and substantially colorless coating. In this way, the REILLEX™ 425-$BF_3$ complex was shown to be useful even in solid epoxy (powder) formulations.

EXAMPLE 13

A solution consisting of 77.8 parts D.E.R. 330™ epoxy, 11.1 parts Niax® LG-56 polyol and 11.1 parts of the preferred REILLEX™ 425-$BF_3$ complex was mixed in a small aluminum cup. This mixture was placed in a 130° C. oven where gelling occurred in 2 hours to give a hard, clear casting. In so doing, it was demonstrated that such fillers, extenders, and diluents as are common and available in the art can be used with the REILLEX™ 425-$BF_3$ complex without destroying its curing capabilities.

EXAMPLE 14

As a check on the curing ability of the applicants' preferred polymer resin in free base form, a solution consisting of 87.5 parts D.E.R. 330™ epoxy and 12.5 parts of REILLEX™ 425 resin alone was prepared and placed in a 130° C. oven. In 15 minutes a dark green liquid was obtained. Continued heating resulted in no visible curing, thus proving that the non-complexed polyamine support does not itself bring about an amine-catalized resin cure. This is contrasted by the surprising and beneficial results obtained with the applicants' complexed materials.

What is claimed is:

1. A latent curing agent for an epoxy resin comprising boron trifluoride complexed with a cross-linked polymer support containing at least about 10% by weight of pendant pyridine groups.

2. The curing agent of claim 1 wherein the polymer support is a copolymer derived from a vinylpyridine.

3. The curing agent of claim 2 wherein the vinylpyridine is 4-vinylpyridine.

4. The curing agent of claim 3 wherein the polymer support is poly(4-vinylpyridine) cross-linked with about 2% to 50% divinylbenzene.

5. The curing agent of claim 4 wherein the poly(4-vinylpyridine) is cross-linked with 25% divinylbenzene.

6. The curing agent of claim 5 wherein the polymer support is in the form of a macroreticular bead.

7. The curing agent of claim 6 wherein the average size of the polymer support bead is less than about 30 μm.

8. The curing agent of claim 7 wherein the average bead size of the polymer support is up to about 10 μm.

9. The curing agent of claim 2 wherein the vinylpyridine is 2-vinylpyridine.

10. The curing agent of claim 9 wherein the polymer support is poly(2-vinylpyridine) cross-linked with about 2% to 50% divinylbenzene.

11. The curing agent of claim 10 wherein the poly(2-vinylpyridine) is cross-linked with 25% divinylbenzene.

12. The curing agent of claim 11 wherein the polymer support is in the form of macroreticular bead.

13. The curing agent of claim 12 wherein the average bead size of the polymer support bead is less than about 30 μm.

14. The curing agent of claim 13 wherein the average bead size of the polymer support is up to about 10 μm.

* * * * *

UNITED STATES PATENT AND TRADEMARK OFFICE
CERTIFICATE OF CORRECTION

PATENT NO. : 5,504,161
DATED : April 2, 1996
INVENTOR(S) : Charles R. Marston et al.

It is certified that error appears in the above-indentified patent and that said Letters Patent is hereby corrected as shown below:

In col. 2, line 32, please delete "BF3" and insert in lieu thereof --$BF_3$--.
In col. 4, line 9, please delete "BF3" and insert in lieu thereof --$BF_3$--.

Signed and Sealed this

Third Day of February, 1998

Attest:

BRUCE LEHMAN

Attesting Officer

Commissioner of Patents and Trademarks